Figure 1:
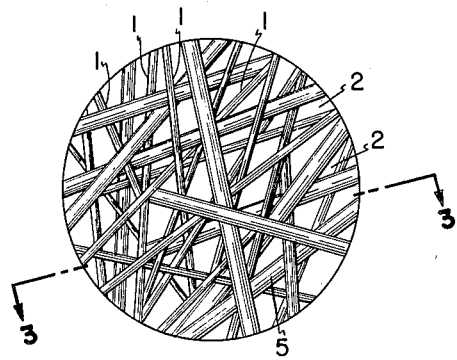

Feb. 7, 1950     W. A. HERMANSON     2,496,665

COMPOSITE TRANSPARENT SHEET

Filed June 10, 1949

INVENTOR.
WILLIAM A. HERMANSON
BY
ATTORNEY

Patented Feb. 7, 1950

2,496,665

UNITED STATES PATENT OFFICE 2,496,665

COMPOSITE TRANSPARENT SHEET

William A. Hermanson, Brookline, Mass.

Application June 10, 1949, Serial No. 98,377

5 Claims. (Cl. 117—15)

The present invention relates to a fabricated sheet of material which has as a base a web of synthetic fibres of the nature of a web of paper impregnated with a transparent synthetic resin forming the fabricated sheet which in the present case is called a plastic film or sheet. The present invention is a continuation in part of my previously filed applications, Serial No. 561,255, and now abandoned filed October 31, 1944, and Serial No. 695,628, filed September 9, 1946.

In my earlier application, I disclosed a plastic film or sheet employing a paper web of nonhydrated, deflocculated fibres made up in general of a composition of cellulose acetate fibres, viscose fibres, and other materials such as wood pulp in certain proportions. I also pointed out that such a sheet when impregnated with a plastic film and permitted to dry would become substantially transparent and show on both surfaces, printing or color, whatever may have been impressed upon the so-called paper web.

In my later application, I discovered a means by which the transparency could be further enhanced and the sheet further improved by certain changes and employment of new means. In the later case, I also disclosed a paper web impregnated with a plastic film used as one element of a laminated structure, the other sheet of the structure being composed of a material having translucent or transparent characteristics to whatever degree desired. This combination of laminated sheets was used to provide a background surface of desired colors which may be opaque or partially transparent, permitting the passage of a certain amount of colored light by the coloring of the surface on which the film is applied. Primarily, however, my application, Ser. No. 695,628 related to the impregnation of an absorbent so-called paper web having wet strength and consisting of nonhydrated, deflocculated fibres upon which a design was imprinted and which thereafter was impregnated with a transparent plastic which was polymerized or cured after impregnation.

The subject matter of the present invention embraces the subject matter of the above-mentioned case, but it is desired here to emphasize certain relationships which while resulting from the structural combinations set forth in the prior cases have not been fully explained more from the point of view of their operation and analysis rather than from the results disclosed which have been known and appreciated by the inventor.

The sheet of the present invention has a very high tensile strength because of the unique structure of the paper web and will therefore greatly resist tearing of the sheet in practically all directions. Plastic sheets according to the present invention may be made of substantially any desired thickness, of the order of .001 to .01 inch and even thicker. In the formation of plastic sheets of the thicker dimension mentioned, the present invention finds particular merit since under ordinary conditions a thick web of paper will be dense and when impregnated would provide a milky, cloudy, or opaque appearance because of the fibres acting as a screen to block the passage of light, which would not permit to any great degree designs or colors to show through the film.

Instead of building up or forming the paper web to be impregnated of layers of ordinary thickness which are usually no greater than 1.5 denier, a larger denier of fibre is used, for instance 3 to 5.5, so that the web is composed of fewer layers for the desired thickness of web. I have found that the larger denier webs have a random deflocculation providing comparatively larger interstices of the order of 25 to 150 microns than when smaller fibre diameters are used. The thickness of the web used in the present invention is a measure or function of the fibres used.

A very important feature in the present invention is that fibres of considerably different denier are used in combination. For instance, as an example in the present case, the web may be composed of 10% fibres of 5.5 denier and a greater portion of the remaining fibres of 3 denier. With a combination of this nature, there is a distinct tendency for spaces or openings in between the layers of the fibres as such may be called layers, adjacent or bordering the interstices through the web so that when the web becomes impregnated, the liquid forms a continuous medium which spreads out between the fibre layers. It is believed that this feature greatly aids in the transparency of the web since the plastic impregnated material acts to reflect the light through the interstices from the material which lies between the outer surfaces of the paper webs.

The use of a comparatively small amount of large diameter fibres which for the most part lie crisscross and non-parallel to the web surfaces provide the spaces or voids extending under the web surfaces. These spaces are actually visible with microscopic examination. It is somewhat difficult to define the limitations of combination of fibre thicknesses by which this creation of voids under the surface of the webs are obtained. The applicant has found, however, that in general this may be accomplished by a comparatively smaller percentage of the larger fibres and in certain sheets the percentage of 5.5 denier which is approximately the largest desirable fibres, only 10% of these fibres need to be used in the composite sheet. The rest of the fibres may be of 3.3 denier or the greater part may be of 3.3 denier with others of a smaller diameter. While only 10% of the larger fibres are necessary for forming a sheet of the present type, it is possible to use a much greater percent of these larger fibres and this is particularly desirable in the formation of thicker sheets.

Figure 2:
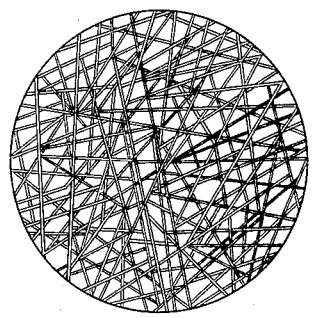
Figure 3:
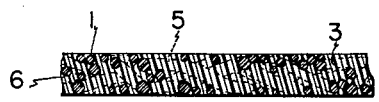
Figure 4:
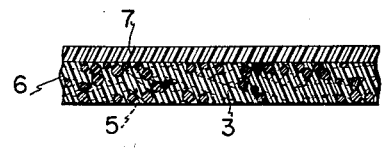
Figure 5:
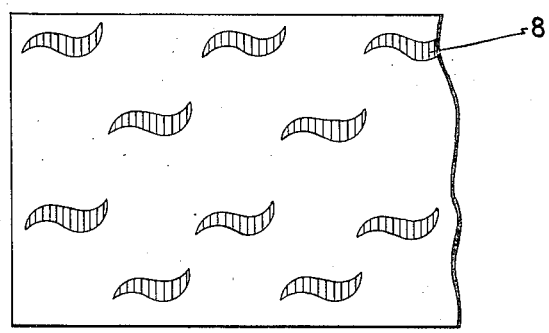

The invention will be more fully described in the specification below when taken in connection with the drawings illustrating the present invention, in which Fig. 1 shows a view under microscope looking at the web used in the present invention; Fig. 2 shows a similar view looking at an ordinary paper web; Fig. 3 shows a section taken across Fig. 1 on the line 3—3 showing the plastic impregnation of the web; Fig. 4 shows a laminated structure; and Fig. 5 shows a plan view of a sheet imprinted with a design.

In the drawings a web is initially formed as shown in Fig. 1 comprising non-hydrated deflocculated absorbent fibres 1, 1, 1, etc., having diameters 3 and 5.5 denier and some others of denier less than 3, approximately 1.5 or other synthetic fibres of staple length, but longer or shorter fibres may be used. Other equivalent synthetic fibres, such as viscose, nylon, vinylidine chloride, etc., may also be used for this purpose provided they have the same properties, although cellulose acetate fibres appear to be better. These fibres are deflocculated by known means in a web of substantially one to three average thicknesses, with spaces or openings such as 2, 2 etc., having a mean average diameter ranging from 25 to 150 microns. The web for this purpose should have as few effective fibre layers as possible so that if a thicker web is desired a proportionately thicker fibre should be used. In this way, the effective number of fibre layers may be held to a minimum, of the order of one to three, for instance.

While the expression of fibre layers has been used above, this is not strictly true in the sense that there are layers of parallel surfaces forming the webs. As indicated in Fig. 1, the larger fibres particularly cross over one another through the inclined directions with the surfaces of the web so that they normally would run from one surface through the web to the opposing surface. In this respect the small fibres tend to form the web surfaces while the larger fibres tend to act as the inclined beams through what might be called normal web layers. This has two desirable effects. The first is that it provides spaces under the web surfaces in which the impregnating plastic spreads out furnishing the reflecting medium for the efficient transmission of light. The second effect is that the web is greatly strengthened due to the strength of the larger fibres penetrating throughout the web in directions other than parallel to the web surfaces.

If the arrangement above is followed, it is also true that interstices of one layer will not be blocked off by superimposed layers to such an extent that the resultant interstices will be diminished to a value less than an average, between 25 and 150 microns. By these means a fairly open screen is obtained relative to the thickness of the web, resulting when impregnated and cured with a water white plastic in a substantially transparent web or sheet which will permit clear delineations of figures and transmission of color as well, with only slight impedance or absorption. This web is also strong and durable.

After the web has once been formed, it may be impregnated with a water white plastic 3 comprising a transparent synthetic resin fluid polymerized by conventional methods. The material may be thermoplastic or thermosetting, whichever is desired.

The surface 5 of the web may be printed on in color or in black or white, before impregnation, and after impregnation with the fluid water white plastic 3, and further treatment such as curing or polymerization, the print and color will clearly show through on both sides of the finished film.

If desired, this plactic film 6 (Fig. 3) may be combined in a laminated structure as shown in Fig. 4. Here a sheet or film 7, which may be opaque, transparent, with or without color or print, may be laminated to the sheet 6 to form a plate or sheet. If the sheet 6 is transparent, the print or color on the inner face of the sheet 7 will show through, or if the sheet 6 is printed on the inner side it may show through both sides of the composite sheet if the sheet 7 is a transparent film.

Fig. 5 shows the surface 8 of a sheet which may be that of the composite sheet of Fig. 4 or the impregnated sheet of Fig. 3, the web of which has been printed on.

If desired, the paper web employed may have on one side a permeable face with a surface of non-absorbent fibres and on the other side absorbent fibres. Upon the first side solid color or colors may be imprinted forming a background which will be seen through the web when it has been impregnated, polymerized and cured. The absorbent fibre side may be printed with design and color as usual, the non-absorbent fibres preventing the solid colors used on it from running into the pigment which has been used on the absorbent side of the web.

The polymerization of the sheet may take place in the usual manner by the application of heat with the use of a catalyst, acetyl or benzoyl peroxide, composed of one half of one percent (by weight) of impregnated resin. If a "Laminac" type of resin is used, which is a composition of styrene and alkyd resins known by the trade name of "Laminac," then the curing should be done by heat with pressures of 15 to 100 pounds per square inch at temperatures no greater than 240° F. If melamine resin is used, then curing pressures are around 1100 pounds per square inch with an optimum temperature of about 290° F.

In a web of the type used in the present invention, deniers of 3 to 5.5 have approximate diameters of 20 to 25 microns. In the present invention, thicknesses may range from six thousandths to fifteen thousandths of an inch, which corresponds to a magnitude of approximately from 150 microns to 350 microns or somewhat greater. Due to the fact that the sheets are calendered and pressed together, the actual number of effective layers of fibres per sheet is not readily determined. However, in the present case the effective number of fibre layers may range from 3 to 10 or more, depending upon whether the fibres are loose or pressed together. In the present invention, fibres used may range, as stated, from 3 to 5.5 denier with the larger diameter fibres preferably predominating in the thicker sheets so that fewer effective fibre layers will be used. In this way, the deflocculation effected will be such as to provide openings of large linear dimensions of the order of 25 to 150 microns, which is comparable substantially to the thickness of the sheet and also of the order of five times the fibre thickness.

Having now described my invention, I claim:

1. A composite transparent sheet comprising a paper web consisting of a mixture of randomly deflocculated synthetic organic fibres, having not less than 10% nor more than 50% of a denier of 5.5 and the balance of fibres of a denier of 3 to 1.5, said fibres being intimately mixed in overlapping criss-crossed and heterogeneous relation to each other, thereby providing comparatively large interstices of the order of 25 to 150 microns and which extend in random relation through the full thickness of the sheet, the web being completely filled with a transparent polymerized synthetic resin.

2. A composite sheet as set forth in claim 1, in which the paper web has print applied to one side before being filled, whereby print will show through both faces of the composite sheet.

3. A composite sheet as set forth in claim 1, in which approximately 10% of the fibres are of 5.5 denier and the balance of fibres 3 to 1.5 denier.

4. A composite sheet as set forth in claim 1, in which the web before being filled has on one face thereof a coating of non-absorbent fibres of approximately 1.5 denier.

5. A composite sheet as set forth in claim 1, in which the web before being filled has on one face thereof, a coating of non-absorbent fibres of approximately 1.5 denier on which a color is printed and has on its other face a print of a different color.

WILLIAM A. HERMANSON.

No references cited.